Feb. 24, 1953　　　　　R. C. TILLINGHAST　　　　2,629,316
AUTOMATIC REEFER FOR COTTON COMPRESS MACHINES
Filed Jan. 8, 1951　　　　　　　　　　　　　　5 Sheets-Sheet 1
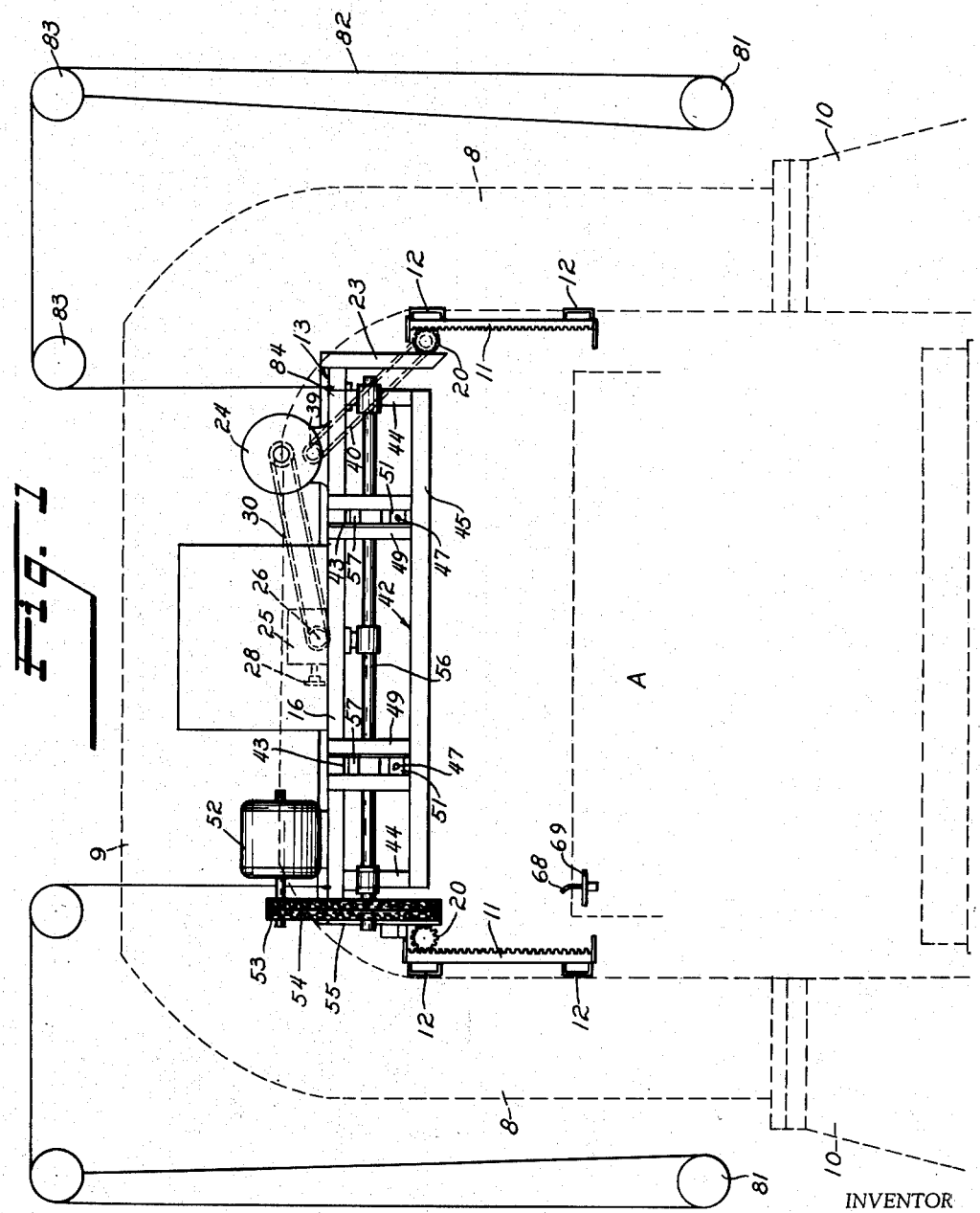
INVENTOR
R. C. Tillingast
BY *[signature]*
ATTORNEY Feb. 24, 1953 R. C. TILLINGHAST 2,629,316
AUTOMATIC REEFER FOR COTTON COMPRESS MACHINES
Filed Jan. 8, 1951 5 Sheets-Sheet 2
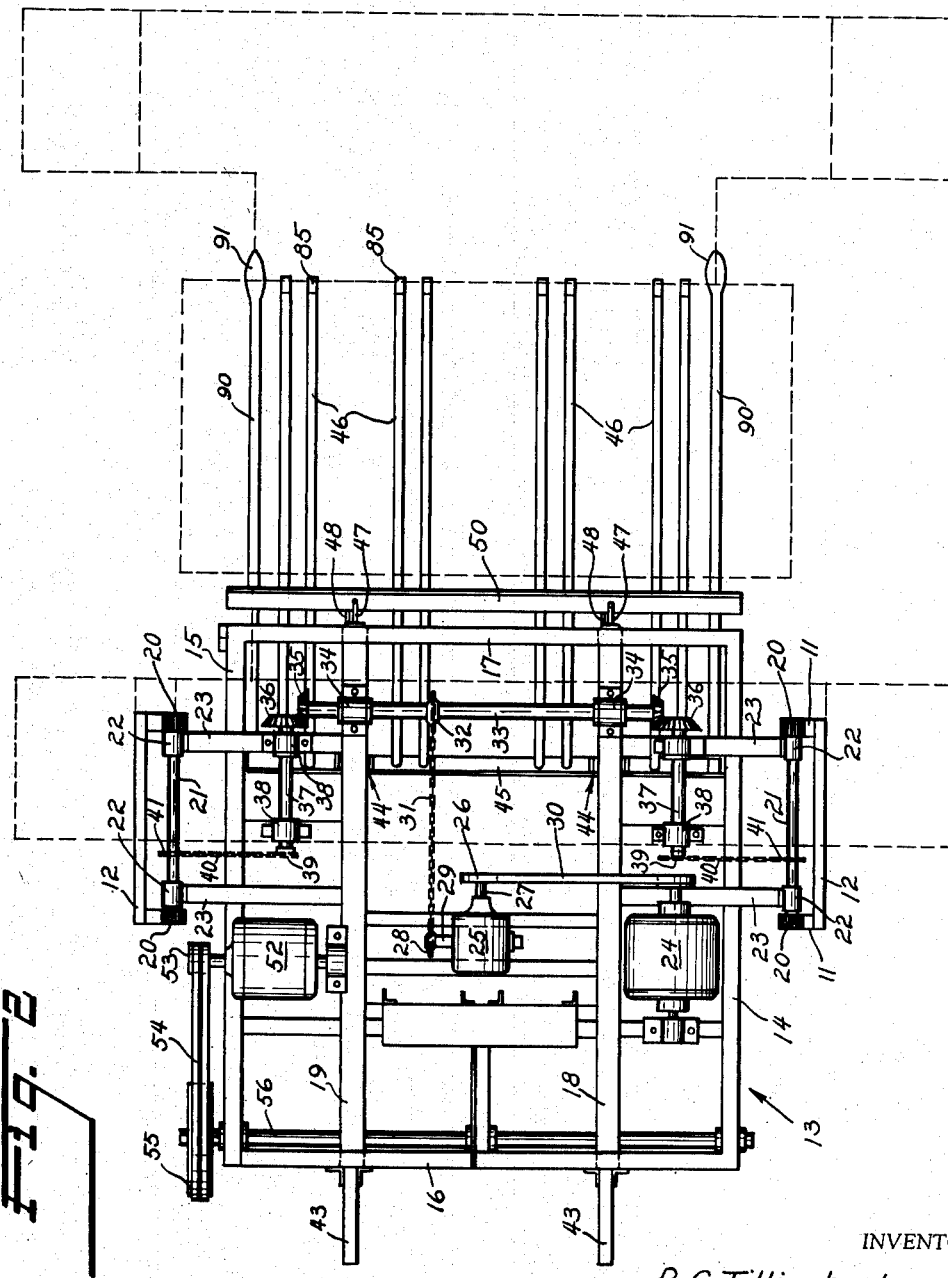
INVENTOR
R. C. Tillinghast
BY
ATTORNEY Feb. 24, 1953 R. C. TILLINGHAST 2,629,316
AUTOMATIC REEFER FOR COTTON COMPRESS MACHINES
Filed Jan. 8, 1951 5 Sheets-Sheet 3
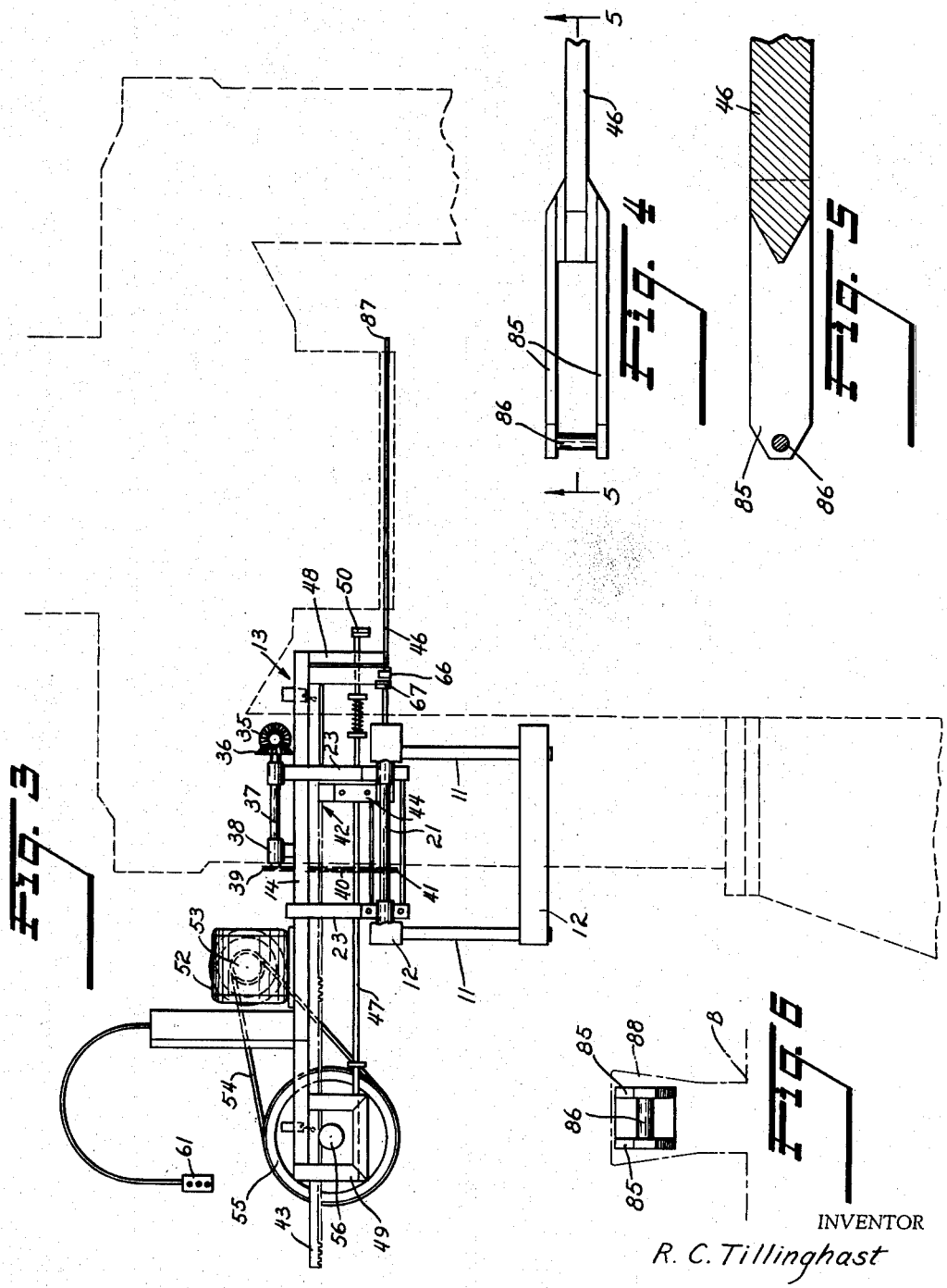
INVENTOR
R. C. Tillinghast
BY
ATTORNEY

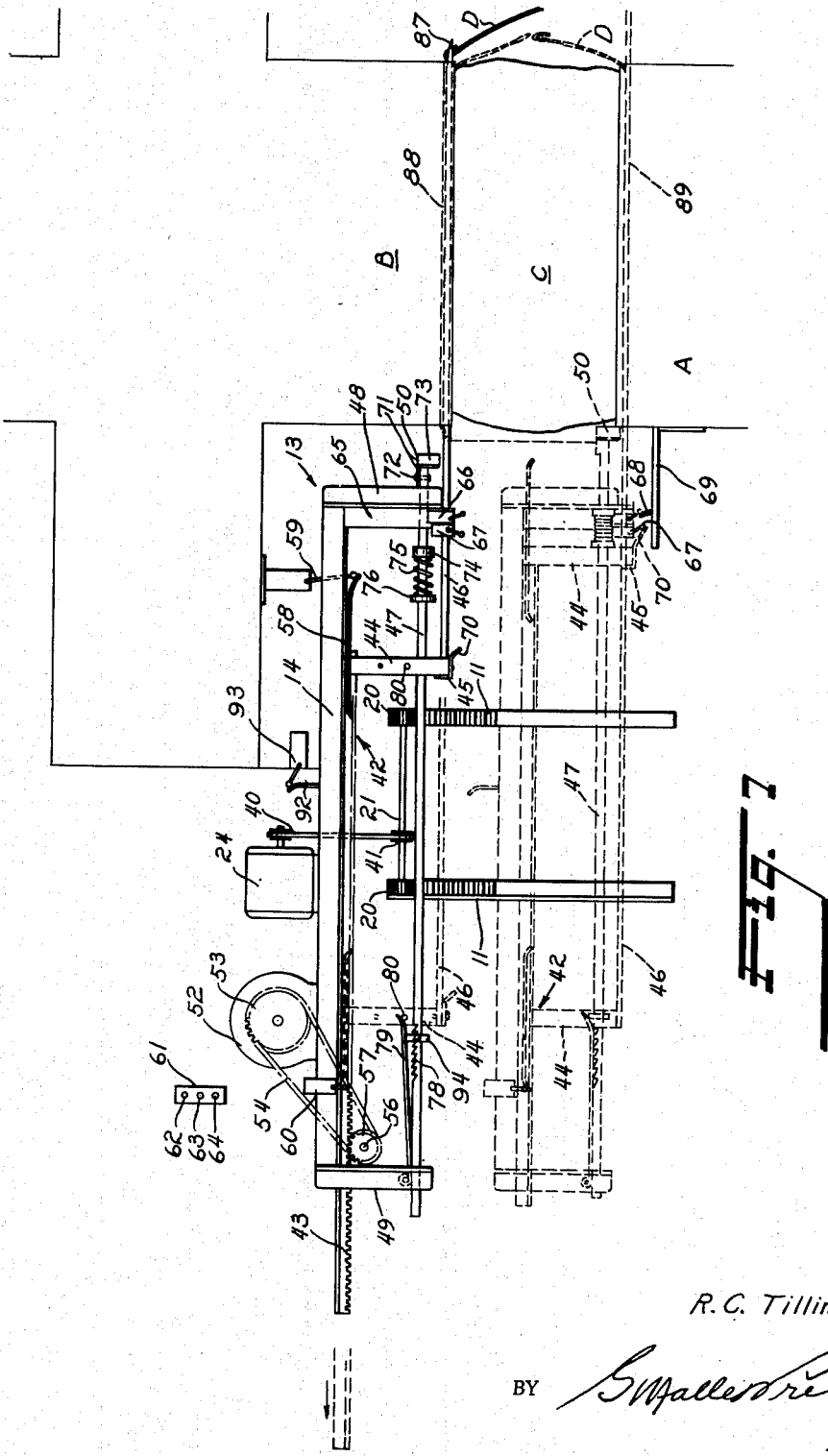

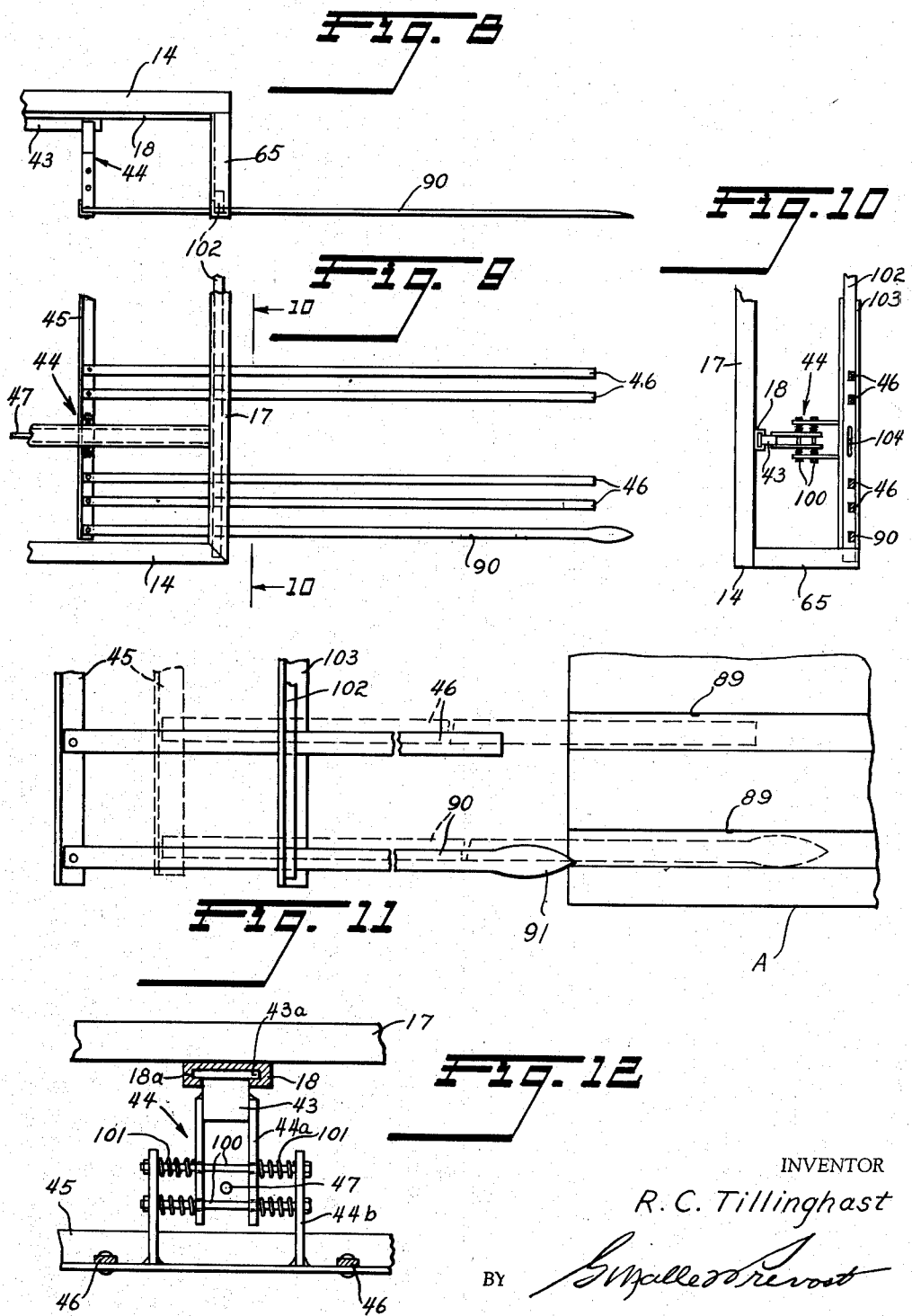

Patented Feb. 24, 1953

2,629,316

UNITED STATES PATENT OFFICE 2,629,316

AUTOMATIC REEFER FOR COTTON COMPRESS MACHINES

Ray C. Tillinghast, Memphis, Tenn., assignor to National Cotton Compress and Cotton Warehouse Association, Memphis, Tenn., a corporation of Louisiana Application January 8, 1951, Serial No. 204,997

17 Claims. (Cl. 100—8)

My invention consists in new and useful improvements in an automatic reefer for cotton compress machines and has for its object to provide a mechanism for automatically applying baling wire or bands to compressed bales of cotton or the like, to eliminate the necessity of time consuming hand operations previously necessary for this purpose.

In the use of cotton compress machines the cotton bale turned out by the cotton gin is partially covered with burlap bagging or jute bagging and bound by a series of metal bands known as "ties," which are usually held together at their ends by a suitable buckle. For shipment to domestic cotton mills these bales are compressed by the compress machine, to a standard density of from 22 to 25 lb. per cubic foot and the dimensions of a standard bale are approximately 60" x 19" x 30". For export, the cotton bales are usually compressed to a high density of from 32 to 35 lb. per cubic foot with dimensions of approximately 60" x 18" x 20".

In effecting the compressing operation the bale is placed between two superimposed horizontal platens, the lower of which is raised by hydraulic, mechanical, or steam pressure to reduce the size of the bale. Ordinarily, each platen is provided with a series of transverse channels of a width and depth sufficient to accommodate the bands or ties to be secured around the bales. Heretofore, these bands or ties have been applied by manual labor which necessitated two sets of men, one on either side of the machine. One set of men was required to push the bands through the channels of one platen while another set of men on the other side of the machine, received the ends of the bands, pulled them through, then passed them back through the channels of the opposite platen, after which the first group of men inserted one end of each tie into buckles on the other ends of respective ties. During this operation the bale was maintained in a tightly compressed condition by the compress machine and upon the release of pressure the buckled bands held the bale in its reduced size.

It is the primary object of the present invention to simplify the operation of reefing cotton bales and to provide a structure comprising a series of parallel spaced tie-engaging fingers or bayonets mounted on a common frame, which is capable of movement as a unit, both in a horizontal direction and in a vertical direction and provided with automatic mechanism for causing said fingers to move through a cycle of operation which will pull the ties over one horizontal side of a bale between the bale and the platen, then over one vertical side of the bale and finally back over the opposite horizontal side of the bale, presenting the two ends of the respective ties on the starting side of the bale, for buckling or securing around the bale.

Another object resides in the provision of a dual frame assembly for supporting a series of tie-engaging bayonets and consisting of a main frame capable of vertical movement between two horizontal planes which define the upper and lower limits of the compressed bale, and a supplemental bayonet carrying frame, vertically movable with the main frame but slidably supported thereby, for longitudinal movement toward and away from the bale, in horizontal planes determined by limits of vertical movement of the main frame.

A further object of the invention is to provide, in conjunction with the dual frame arrangement, a band holder for maintaining the bands in position upon completion of their travel around the bale and until the fingers have been withdrawn.

A still further object of the invention is to provide means for automatically aligning the fingers of the tie-engaging unit with corresponding channels in the adjacent platens, to compensate for any slight shifting of the platens as a result of wear.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts through the several views, Figure 1 is an end view of the reefer taken from the back of a compress machine, the latter being shown in dotted lines.

Figure 2 is a top plan view of the structure shown in Figure 1.

Figure 3 is a view in side elevation, showing the tie-engaging fingers in their initial position. In this figure the lower platen of the compress machine has been omitted but the remainder of the machine is indicated in dotted lines.

Figure 4 is a top plan view on an enlarged scale, showing the tie-engaging end of one of the fingers.

Figure 5 is a sectional view of the same, taken on line 5—5 of Figure 4.

Figure 6 is an enlarged detail showing an end view of one of the platen grooves.

Figure 7 is a side elevational view of a simplified diagrammatic nature, illustrating the various steps in the cycle of operation of the reefer.

Figure 8 is a detailed view in side elevation showing the tie-engaging unit.

Figure 9 is a plan view of the same partly broken away.

Figure 10 is a sectional view taken on line 10—10 of Figure 9.

Figure 11 is an enlarged detail showing the guide or pilot fingers for aligning the tie-engaging unit.

Figure 12 is a sectional detail of the shiftable mounting means for the tie-engaging finger bar.

In the drawings, referring to Figure 1, I have shown in dotted lines the rear portion of a compress machine, including transversely spaced vertical posts 8 connected by a crosshead 9 and supported on bases 10. On opposite inner faces of the press posts 8, I provide vertical racks 11 arranged in opposed pairs, as will be seen in Figures 6 and 7, said racks being preferably welded or otherwise secured to vertically spaced, horizontal angles 12 mounted on the posts 8. As will later appear, these opposed pairs of vertical racks support the reefer frame for vertical movement between two horizontal planes, in the course of its operation.

The main reefer frame, as generally indicated by the numeral 13, is rectangular in shape, as will be seen from Figure 2, and is preferably formed of angle iron side members 14 and 15, connected by end members 16 and 17, all welded or otherwise secured together. At spaced points between the side members 14 and 15, I provide a pair of longitudinally extending supports 18 and 19 which are welded or otherwise secured at opposite ends, to cross members 16 and 17, respectively.

The frame 13 is supported for vertical movement on the racks 11, by two pairs of pinions 20—20 which are mounted on shafts 21—21, journalled in suitable bearings 22, secured to the respective outer faces of the vertical legs or angular brackets 23, suspended from the frame 13. As shown in Figures 1 and 2, these brackets 23 overhang the side members 14 and 15 of the frame and are preferably welded to the supports 18 and 19 as well as the respective side members.

The vertical movement of the frame 13 is effected by a train of mechanism consisting of a motor 24, which is mounted by any suitable means on top of the frame 13, and operatively connected to a gear box assembly 25, carried between the longitudinal supports 18 and 19, as seen in Figure 2. A pulley or sprocket 26 is fixed on a shaft 27 which extends into the gear box and by suitable gearing, operates a second sprocket 28 on a shaft 29, the latter being arranged at right angles to the shaft 27. The motor 24 is connected to the pulley or sprocket 26 by means of a chain or belt 30 so that the operation of the motor, through the sprocket 26 effects rotation of the sprocket 28.

By means of a chain 31, the sprocket 28 is connected to a sprocket 32, fixed on a transverse shaft 33 which is journalled in bearings 34 on respective supports 18 and 19. At opposite ends of the shaft 33 and rotatable therewith, are bevel gears 35 which mesh with complementary bevel gears 36, carried on the ends of short shafts 37, journalled in bearings 38 which are suitably supported on the upper portion of the frame 13. The opposite ends of the shafts 37 carry sprockets 39 which, by means of chains 40, operatively connect the sprockets 39 with sprockets 41, mounted intermediate the ends of the pinion-supporting shafts 21.

Thus, operation of the motor 24 in the proper direction rotates the gear box assembly 25 and through sprocket 28, chain 31, and sprocket 32, rotates the shaft 33. Rotation of the shaft 33, through the meshing bevel gears 35 and 36 and shafts 37, rotates the sprockets 39, which in turn cause rotation of the pinion-carrying shafts 21 and their respective pinions 20, to either elevate or lower the frame 13 on the vertical supporting racks 11.

Supported by the main frame 13 and movable therewith to its vertical extremities, is a supplemental, finger-supporting frame generally indicated by the numeral 42, which consists of a pair of longitudinally extending, transversely spaced toothed racks 43, supported for longitudinal sliding movement with respect to the frame 13 by means of the supports 18 and 19. The forward ends of the racks 43 support a pair of depending vertical legs 44, across the lower ends of which is mounted a finger-supporting bar 45, preferably in the form of an angle-iron which extends transversely, substantially across the frame 13. In order to insure the proper alignment of the tie-engaging fingers with their respective channels or grooves in the platens A and B, it is desirable that the finger-supporting bar 45 be so mounted with respect to the legs 44 as to be transversely shiftable. The details of this mounting structure are illustrated in Figures 8 to 12, inclusive, and will be referred to later in this specification.

A series of band-engaging fingers or bayonets 46, arranged in transversely spaced groups, are fixed to the bar 45 and project forwardly therefrom so that when the reefing mechanism is installed adjacent the compress machine shown in dotted lines in the drawings, the fingers 46 are adapted to enter the conventional band grooves or channels provided in the upper and lower platens respectively, of the compress machine. The fingers 46 are of a length such that, when in their forward-most position, their ends protrude slightly beyond the platens of the compress machine as will be seen from Figures 3 and 7.

Referring now to Figures 8 to 12, the longitudinal supports 18 and 19 which extend between the cross members 16 and 17 are fixed to the under sides of the cross members and slidably support respective racks 43. Preferably the supports are provided with longitudinally extending grooves or tracks 18a which receive complementary guide flanges 43a on the upper faces of the racks 43 as shown in Figure 12.

The legs 44 in the form shown in these figures, are each made up of two parts 44a and 44b. Part 44a consists of two leg sections welded at their upper ends to the sides of the rack 43, their lower portions being transversely drilled to slidably receive a pair of cross bars 100. Opposite ends of these cross bars extend through complementary openings in a second pair of leg sections which comprise the lower part 44b of the leg 44. Each of the cross bars 100 carries a coil spring 101 disposed between the outer face of the upper leg sections 44a and the inner faces of the lower leg sections 44b, and the cross bars are held in place by suitable nuts. To the lower ends of the lower sections 44b I weld the finger-supporting bar 45. Thus, the finger-supporting bar 45 and the projecting fingers 46 carried thereby are transversely shiftable as a unit with respect to the upper portion 44a of the legs 44.

At either end of the finger bar unit, I provide a finger guide or pilot member 90 which extends slightly beyond the ends of the fingers 46, as shown in Figures 9 and 11. These pilots consist of flat pieces of iron which have their leading ends slightly enlarged with converging edges as shown at 91, which facilitate the entrance of the pilot in the adjacent channels 89 of the lower platen A.

Very few compress machines are built with enough precision for the upper and lower platen channels to be in the same vertical plane and therefore this arrangement for insuring alignment of the tie-engaging finger unit with both platens is an essential feature of the present invention. By this construction, the converging surfaces 91 at the leading ends of the finger pilots 90 engage the end channels of either platen upon the forward movement of the tie-engaging unit and the fingers are shifted as a unit into proper alignment with respective channels.

At the forward end of the frame 13 adjacent the forward supporting structure 48, I provide downwardly extending supporting arms 65 secured to the cross supports 17 and extending across these arms 65 is a bar 103 which supports the forward ends of the tie-engaging fingers 46, the latter extending through suitable slots in the bar 103, which slots are of sufficient length to permit a transverse sliding or shifting of the fingers of approximately one inch parallel to the bar 103. A second bar 102 also slotted to receive respective fingers 46 is mounted in sliding engagement with the angle bar 103 and is retained in sliding engagement by means of a slot and pin arrangement 104 as shown in Figure 10. The slots in the bar 102, however, are of a size to maintain a close sliding fit with respect to the fingers 46 so that when the finger-supporting bar 45 is shifted transversely by the pilots 90, the forward ends of the fingers are shifted as a unit, through the medium of the sliding bar 102. A band holder 50 is supported by means of two transversely spaced longitudinally extending rods 47, the opposite ends of which are disposed for limited longitudinal sliding movement, in front and rear supporting structures 48 and 49 respectively. The front supports 48 preferably consist of vertical angles rigidly secured at their upper ends to the end member 17 of the frame 13, at spaced points adjacent the longitudinal supports 18 and 19 respectively, as will be seen from Figure 2. These angles 48 are provided with openings for slidably receiving the forward ends of the rods 47 which protrude therefrom and have secured thereto, the band holder 50, the details of which will be hereinafter described.

The rear supporting structure 49 preferably consists of two pairs of transversely spaced rectangular framework assemblies, formed of angles as shown in Figures 1 and 2, with apertured cross pieces 51 extending between each pair to slidably embrace the rear ends of the rods 47. The rods 47 also pass slidably through suitable openings in the vertical legs 44, upon which the finger supporting bar 45 is mounted. Horizontal reciprocation of supplemental frame 42 and with it the fingers 46, is effected by means of a second motor 52, supported on top of the main frame 13 and having at the outer end of its operating shaft, a pulley or double sprocket 53. The latter is connected by means of a pair of belts or chains 54, to a double sprocket or pulley 55 mounted on a shaft 56, journalled in the side members 14 and 15 of the main frame 13, and centrally supported by the rear framework structure 49. On the shaft 56, adjacent each of the supplemental frame racks 43, is keyed a pinion 57 which meshes with its respective rack 43 so that upon operation of the motor 52 and the chain of mechanism just described, the supplemental frame 42 is moved either forwardly or rearwardly with respect to the main frame 13, causing the fingers or bayonets 46 to move forwardly or rearwardly with respect to the bale of cotton disposed between the compress platens.

The limits of the forward and rearward movements of the supplemental frame 42 are determined by the following mechanism. Referring to Figure 7 which, as before stated, is a simplified diagrammatic showing which does not strictly follow the other figures in some instances, it will be seen that between the racks 43 the supplemental frame carries a contact shoe 58, the front and rear ends of which are turned downwardly to respectively serve as abutments for tripping the electrical switches 59 and 60 which are electrically connected in the circuit controlling the motors 24 and 52, which are set into operation by the main control box 61. The details of the electrical wiring system are not shown as they specifically form no part of the present invention and it is believed that anyone skilled in the art would readily understand the proper wiring system to render the invention operative. It may be stated, however, that the main switch box 61 includes switches 62, to effect initial rearward movement of the supplemental frame 42; 63, to effect reverse movement thereof; and 64 for stopping the motors.

Thus, when switch button 62 is pushed, the motor 52 is set into operation and through pinions and racks 57—43, the supplemental frame 42 is moved rearwardly until the contact shoe 58 engages switch 60. At this point motor 52 is stopped and motor 24 is set into operation. Motor 24 through its connections to the pinions 20 and their complementary racks 11, causes the main frame 13 and with it the supplemental frame 42 to be lowered to the position shown in dotted lines in Figure 7.

The lower end of one of the supporting arms 65 carries two switches 66 and 67 for engagement respectively by an abutment 68 carried on a bracket 69 fixed to the lower platen A of the compress machine, and an abutment 70 projecting forwardly and downwardly from the finger or bayonet supporting bar 45. These switches 66 and 67 are so connected into the electrical circuit controlling the motors 24 and 52, that when the switch 66 contacts the abutment 68 in the downward movement of the main frame 13, the motor 24 is stopped and the motor 52 which has previously moved the supplemental frame 42 to its rearward limit, as previously described, is set into operation in the reverse direction. This causes the supplemental frame 42 and with it the bayonets 46, to move forwardly until the abutment 70 on the bayonet-carrying bar 45, contacts the switch 67 which reverses the motor 52 and starts a reverse operation of the cycle just described, to return the frames and bayonets to their initial starting positions. A contact 92 on main frame 13 engages switch 93 when the frame has reached its uppermost position in the return cycle, to stop motor 24 and start motor 52 for returning the supplemental frame and the bayonet unit to their original position as shown in full lines in Figure 7.

In the course of the operation just described, the band holder 50, carried at the forward ends of the rods 47 is brought into play. This band holder preferably consists of a transverse angle 71 secured by rivets 72 to the forward ends of the rods 47 and has fixed to its front face, a hardwood board 73 which actually serves as the band abutment of the holder. An adjustable collar 74 is mounted on each of the rods 47 and behind these collars are mounted coil springs 75, at the rearward extremities of which are slidable abutment collars 76 on the shafts 47. Thus, upon the forward movement of the supplemental frame 42 and with it the vertical legs 44, the latter abut the respective slidable collars 76, compressing the springs 75 and moving the rods 47 forwardly until the strip 73 of the band holder 50, engages the bands as will be hereinafter explained in detailing the operation of the mechanism.

The rear ends of the rods 47 are notched as at 78 on their upper sides to engage a pivoted latch 79 secured to the rear supporting structure 49 so that when the supplemental frame has reached its forwardmost position the band holder 50 is retained in engagement with the bands by the latch 79. This latch 79 is released upon near completion of the rear movement of the supplemental frame 42, by engagement with an abutment 80 carried by the legs 44. After the latch is thus raised the band holder is released by the abutment 80 contacting abutment collar 94 as supplemental frame 42 completes its rear movement.

To facilitate the raising and lowering of the frame structure I preferably provide a counterweighting arrangement consisting of weights 81 connected by cables 82 which run over pulleys 83 and are connected at 84 to the top of the frame 13.

Returning to the bayonets or fingers 46, and referring particularly to Figures 4 and 5, it will be seen that these devices carry at their forward ends a pair of spaced arms 85 between which are mounted tie engaging cross pieces 86. These cross pieces are so located with respect to the free ends of the spaced arms 85 that when the fingers 46 are in their extreme projected positions they lie beyond the compress platens A and B as shown at 87, in Figures 3 and 7. As before stated, these fingers 46 are mounted on a supporting bar 45 for shifting movement as a unit, so as to permit their proper alignment with their respective band channels or grooves 88 and 89 in the upper and lower platens respectively and this shifting movement is brought about by the finger pilots 90 through the medium of the converging edges of their forward ends 91. The relationship of the band carrying fingers with respect to the band grooves or channels is shown on an enlarged scale in Figure 6.

In considering a complete cycle of operation of my improved reefer, it is believed that the simplified diagrammatic showing in Figure 7 will facilitate a clearer understanding and reference is here made to that figure. The operation starts with the reefer mechanism in the upper position shown in full lines and with the bayonets 46 extending through the slots or grooves 88 in the upper platen B, the limit switches being set to permit the ends 87 of the bayonets to protrude through the platen approximately one-half inch.

A bale C is placed in the press in the usual manner and the lower platen A is raised by hydraulic, mechanical, or steam means until the bale is compressed and ready for tieing. While the platen A is raised, operators place the hooked ends of bands D over the cross pieces 86 at the ends of the bayonets 46 and, at a signal from the operators that all bands are hooked, an attendant pushes the button 62 in the main switch 61. This starts the motor 52 in operation in a direction to cause the supplemental frame 42, through the medium of the racks 43 and pinions 57, to slide in a horizontal plane toward the left in Figure 7, pulling the bayonets 46 and with them the bands D, through the slots 88 in platen B. This leftward movement continues until the left hand end of the contact shoe 58 engages switch 60, whereupon the motor 52 is stopped and motor 24 set into operation. Motor 24 actuates the pinions 20 in engagement with vertical racks 11, to lower the complete frame assembly, including the main frame 13 and supplemental frame 42, the latter being in its rearmost retracted position as shown in dotted lines in Figure 7. When the frame assembly has reached its lower limit the switch 66, suspended from the main frame 13, engages contact abutment 68 carried on the lower platen A which stops motor 24 and starts motor 52 in a direction to move the supplemental frame and bayonet assembly forwardly in a horizontal plane, pushing the bayonets 46 through the slots or grooves 89 in the lower platen A, the bayonet guides 90 insuring proper alignment of the respective bayonets and slots. This forward movement of the supplemental frame continues until contact abutment 70, carried by the bayonet supporting bar 45, engages switch 67, whereupon motor 52 is reversed to withdraw the bayonets from the slots 89 in the lower platen. Abutment 70 and switch 67 are set to permit a forward movement of the supplemental frame considerably past its upper starting position so that bayonets push the ends of the bands D a sufficient distance past the extremity of the bale C to permit tieing.

At the conclusion of the forward movement of the supplemental frame the rods 47 carrying the band holder 50 are moved forwardly by contact of the vertical legs 44 with the spring cushion assembly 74, 75, 76, on the rods 47 and the band holder 50 is locked tightly against the bands by means of the latch arrangement 78, 79 on the rods 47. The latch maintains the band holder in engagement with the bands for a predetermined time, until the lug 80 releases the latch 79 at the conclusion of the rearward returning movement of the supplemental frame 42. The cycle of operation is then reversed to return the frames and the bayonets to their original starting positions as heretofore described.

Upon completion of the forward movement of the supplemental frame in its lower plane, as shown in dotted lines in Figure 7, the hooked ends of the bands D snap up to the position shown in dotted lines, due to the slight bend imparted to the bands in being pulled and pushed around the bale and the bands are ready for buckling or tieing in the usual manner.

Briefly, the main frame 13 and the supplemental frame 42 carried thereby, comprise respectively, first and second supports, which are relatively movable and co-act to effect a controlled sequence of movement of the tie element around the bale; the first support 13 is shiftable vertically between planes lying parallel with the operating faces of respective platens A and B, and carries with it the second support 42 which actually supports the tie-engaging fingers 46, The second support 42 is movable horizontally on the first support, to reciprocate the fingers in the respective planes of platens A and B, after the first support has vertically positioned them in line for selected movement. The entire mechanism is automatically controlled to regulate the sequence of travel of the fingers so that the tie-engaging ends thereof follow a path which encloses three sides of a bale being tied.

It will thus be seen that I have provided an efficient automatic mechanism which will greatly simplify the reefing of cotton bales and materially reduce the manpower previously required for this operation.

From the foregoing it is believed that my invention may be readily understood by those skilled in the art, without further description, it being borne in mind that numerous changes may be made in the details of the structure, without departing from the spirit of the invention as set forth in the following claims.

I claim:

1. A reefing mechanism for bale compressing machines of the type having a platen assembly including two platens, at least one of which is relatively movable with respect to the other, the operating faces of said platens being provided with parallel spaced channels to accommodate tie elements for encircling a bale compressed therebetween; said reefing mechanism comprising a main frame mounted at one side of said platen assembly for vertical movement between the horizontal planes of the operating faces of respective platens, a supplemental frame slidably mounted for horizontal reciprocation on said main frame, a series of horizontal tie-engaging fingers supported on said supplemental frame and arranged in parallel spaced relation for projection and retraction through the channels of respective platens, reversible drive means for jointly elevating and lowering said frames to determine a selected plane of horizontal movement of said fingers with respect to a bale in said platen assembly, separate reversible drive means for reciprocating said supplemental frame and fingers on said main frame to effect the projection and retraction of said fingers in said selected planes, and means for regulating the sequence of operation of respective drive means to cause said fingers to successively draw corresponding tie elements through the channels of one platen, over one horizontal surface of a compressed bale, then vertically over an adjoining right angular bale surface and finally across the opposite horizontal bale surface to the staring side of the bale.

2. Mechanism as claimed in claim 1 wherein said main frame and supplemental frame are respectively mounted for vertical and horizontal movement by means of corresponding rack and pinion assemblies.

3. Mechanism as claimed in claim 1, including a tie-retaining member for preventing displacement of the manipulated ties at the conclusion of the sequence of travel of said tie-engaging fingers.

4. Mechanism as claimed in claim 3 wherein said tie-retaining member consists of a cross bar slidably supported in said main frame for horizontal movement into and out of engagement with a set of ties encircling said bale, means controlled by the final forward movement of said supplemental frame for locking said retaining member in engagement with said ties and means controlled by the final rearward movement of said supplemental frame for releasing said locking means.

5. In a reefing mechanism for bale compressing machines of the type having a platen assembly including two platens, at least one of which is relatively movable with respect to the other, the operating faces of said platens being provided with parallel spaced channels to accommodate tie elements for encircling a bale compressed therebetween; a tie-manipulating unit comprising a series of parallel, horizontally disposed tie-engaging fingers fixed at one end on a common support and relatively spaced to coincide with the spacing of the channels in said platens, the opposite ends of said fingers being free and adapted to enter respective channels, means for operatively positioning said unit adjacent selected platens, means for horizontally reciprocating said unit to cause said fingers to slide through respective channels, and means for automatically aligning said fingers with the entrances of said channels.

6. Apparatus as claimed in claim 5 wherein said manipulating unit is mounted for transverse shifting movement with respect to said platens and said aligning means comprises at least one pilot fingers adapted to engage one of said channels to automatically shift the remaining fingers as a unit into alignment with respective channels.

7. Apparatus as claimed in claim 6 wherein the end of said pilot finger projects longitudinally beyond the corresponding ends of said tie-engaging fingers, said projecting end being shaped with laterally diverging edges to facilitate the entrance of said pilot finger into an adjacent platen channel.

8. Apparatus as claimed in claim 6, including an intermediate cross member for maintaining the spacing of said fingers, and means slidably supporting said member for transverse movement with the unit.

9. A reefing mechanism for bale compressing machines of the type having a platen assembly including two platens, at least one of which is relatively movable with respect to the other, the operating faces of said platens being provided with parallel spaced channels to accommodate tie elements for encircling a bale compressed therebetween; said reefing mechanism comprising a main frame mounted at one side of said platen assembly by means of vertical racks and pinions, for vertical movement between the horizontal planes of the operating faces of respective platens, a supplemental frame including at least one horizontal rack element arranged for operative engagement with a complementary pinion on said main frame for effecting horizontal reciprocation of the supplemental frame on the main frame, a series of horizontal tie-engaging fingers supported on said supplemental frame and arranged in parallel spaced relation for projection and retraction through the channels of respective platens, reversible drive means for the pinions of the vertical racks for jointly elevating and lowering said frames to determine a selected plane of horizontal movement of said fingers with respect to a bale in said platen assembly, separate reversible drive means for the pinions of said horizontal racks for reciprocating said supplemental frame and fingers on said main frame to effect the projection and retraction of said fingers in said selected planes, and means for regulating the sequence of operation of respective drive means to cause said fingers to successively draw corresponding tie elements through the channels of one platen, over one horizontal surface of a compressed bale, then vertically over an adjoining right angular bale surface and finally across the opposite horizontal bale surface to the starting side of said bale.

10. A reefing mechanism for bale compressing machines of the type having a platen assembly including two platens, at least one of which is relatively movable with respect to the other, the operating faces of said platens being provided with parallel spaced channels to accommodate tie elements for encircling a bale compressed therebetween; said reefing mechanism comprising a main frame mounted at one side of said platen assembly by means of vertical racks and pinions, for vertical movement between the horizontal planes of the operating face of respective platens, a supplemental frame including at least one horizontal rack element arranged for operative engagement with a complementary pinion on said main frame for effecting horizontal reciprocation of the supplemental frame on the main frame, a series of horizontal tie-engaging fingers supported on said supplemental frame and arranged in parallel spaced relation for projection and retraction through the channels of respective platens, reversible drive means for the pinions of the vertical racks for jointly elevating and lowering said frames to determine a selected plane of horizontal movement of said fingers with respect to a bale in said platen assembly, separate reversible drive means for the pinions of said horizontal racks for reciprocating said supplemental frame and fingers on said main frame to effect the projection and retraction of said fingers in said selected planes, a first drive control operable upon the retraction of said supplemental frame and fingers to inactivate said horizontal drive means and activate said vertical drive means, to cause the descent of said frames, a second drive control operable at the conclusion of said descent, to inactivate said vertical drive means and activate said horizontal drive means in the reverse direction, and a third drive control operable upon the completion of said last-named movement to return said frames to their starting positions, whereby said fingers successively draw corresponding tie elements through the channels of respective platens to encircle a bale therebetween.

11. Apparatus as claimed in claim 10 including a tie-retaining member for preventing displacement of the manipulated ties at the conclusion of the sequence of travel of said tie-engaging fingers.

12. Apparatus as claimed in claim 10 including guide means cooperating with at least one channel in respective platens for shifting all of the fingers as a unit, into alignment with the channels of said platens.

13. Apparatus as claimed in claim 12 wherein said guide means comprises a pilot finger projecting longitudinally beyond the corresponding ends of said tie-engaging fingers with its projecting end shaped to facilitate entrance to an adjacent channel.

14. The combination with a bale compressing machine of the type having a platen assembly including two platens, at least one of which is movable with respect to the other to compress a bale therebetween; of a reefing mechanism mounted adjacent said platen assembly and comprising a tie-manipulating unit having at least one tie-engaging finger lying in a plane parallel with the operating faces of said platens and longitudinally extended to overlie and project beyond a bale between said platens, means on the projecting end of said finger for engaging a tie element, a first support movable transversely between planes lying parallel with the operating faces of respective platens, a second support on said first support, mounting said tie-manipulating unit for selective reciprocating movement in said planes, driving means for effecting movement of said second support in selected planes, driving means for shifting said first support from one plane to another, and control mechanism for said driving means for regulating the sequence of the travel of said unit, whereby the tie-engaging end of said finger with a tie element in tow, is caused to follow a path which encloses three sides of said bale.

15. A mechanism as claimed in claim 14 wherein said first and second supports are respectively mounted for vertical and horizontal movement by means of corresponding rack and pinion assemblies.

16. A mechanism as claimed in claim 14, including a tie-retaining member for preventing displacement of the manipulated tie at the conclusion of the sequence of travel of said tie-engaging fingers.

17. A reefing mechanism for bale compressing machines, comprising a tie-manipulating unit having at least one tie-engaging finger lying in a plane parallel with the horizontal faces of a bale to be tied, means on the free end of said finger for engaging a tie element, a first support movable transversely between planes lying parallel with the horizontal surfaces of said bale, a second support on said first support, mounting said tie-manipulating unit for selective reciprocating movement in said planes, driving means for effecting movement of said second support in selected planes, driving means for shifting said first support from one plane to another, and control mechanism for said driving means for regulating the sequence of travel of said unit, whereby the tie-engaging end of said finger with a tie element in tow, is causes to follow a path which encircles three sides of a bale.

RAY C. TILLINGHAST.

REFERENCES CITED

The following references are of record in the file of this patent:

UNITED STATES PATENTS

| Number | Name | Date |
| --- | --- | --- |
| 1,048,623 | Wolfe | Dec. 31, 1912 |
| 1,096,397 | Sheppard | May 12, 1914 |
| 2,037,211 | Campbell | Apr. 14, 1936 |

FOREIGN PATENTS

| Number | Country | Date |
| --- | --- | --- |
| 494,393 | France | May 28, 1919 |